United States Patent
Finkelstein (10) Patent No.: US 11,108,592 B2
(45) Date of Patent: Aug. 31, 2021

(54) SYSTEMS AND METHODS FOR IMPLEMENTING A LAYER TWO PROXY FOR WIRELESS NETWORK DATA

(71) Applicant: Cox Communications, Inc., Atlanta, GA (US)

(72) Inventor: Jeffrey L. Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 173 days.

(21) Appl. No.: 15/002,591

(22) Filed: Jan. 21, 2016

(65) Prior Publication Data
US 2017/0214546 A1 Jul. 27, 2017

(51) Int. Cl.
| | |
|---|---|
| H04L 12/28 | (2006.01) |
| H04L 12/729 | (2013.01) |
| H04W 24/04 | (2009.01) |
| H04L 12/741 | (2013.01) |
| H04L 12/46 | (2006.01) |
| H04W 72/04 | (2009.01) |
| H04L 29/12 | (2006.01) |
| H04W 88/18 | (2009.01) |

(52) U.S. Cl.
CPC ...... H04L 12/4633 (2013.01); H04L 61/6013 (2013.01); H04L 61/6022 (2013.01); H04W 72/0406 (2013.01); H04W 72/0446 (2013.01); H04L 61/2038 (2013.01); H04W 88/182 (2013.01)

(58) Field of Classification Search
CPC .. H04L 12/4633; H04L 47/14; H04W 72/042; H04W 80/04

USPC .................................................. 370/329, 469
See application file for complete search history.

(56) References Cited

U.S. PATENT DOCUMENTS

| | | | | |
|---|---|---|---|---|
| 6,480,489 B1* | 11/2002 | Muller | .................... | H04L 49/90 |
| | | | | 370/389 |
| 7,580,409 B1* | 8/2009 | Swenson | ................ | H04L 49/253 |
| | | | | 370/392 |
| 9,088,584 B2* | 7/2015 | Feng | .................... | H04L 67/1031 |
| 2005/0157750 A1* | 7/2005 | Rabie | ....................... | H04L 12/28 |
| | | | | 370/466 |
| 2006/0014522 A1* | 1/2006 | Krischer | ........... | H04L 29/06027 |
| | | | | 455/410 |

(Continued)

*Primary Examiner* — Asad M Nawaz
*Assistant Examiner* — Jason A Harley
(74) *Attorney, Agent, or Firm* — Eversheds Sutherland (US) LLP (57) ABSTRACT

A request to establish a tunnel over a layer three network connection may be received by a proxy device. The tunnel may then be established by the proxy device. Device information and wireless network information from a mobile device may be received over the tunnel. Responsive to receipt of the device information and the wireless network information, source and destination addresses may be assigned to the mobile device. The source and destination addresses may correspond to the device information and the wireless network information. Internet protocol (IP) packets may be received, via the tunnel, from the mobile device. Layer two frames may be generated utilizing the assigned source and destination addresses. The layer two frames may encapsulate each of the IP packets. The layer two frames may be transmitted to a layer two service function chain (SFC) infrastructure.

17 Claims, 6 Drawing Sheets

(56) References Cited

U.S. PATENT DOCUMENTS

| | | | | |
|---|---|---|---|---|
| 2008/0130490 | A1* | 6/2008 | Yu | H04L 12/4633 370/223 |
| 2008/0205345 | A1* | 8/2008 | Sachs | H04W 36/0011 370/332 |
| 2009/0240789 | A1* | 9/2009 | Dandabany | H04W 36/0011 709/220 |
| 2010/0189103 | A1* | 7/2010 | Bachmann | H04W 28/06 370/389 |
| 2011/0141512 | A1* | 6/2011 | Coleman | G06K 15/00 358/1.15 |
| 2012/0063428 | A1* | 3/2012 | Ng | H04W 36/0016 370/338 |
| 2013/0114540 | A1* | 5/2013 | Ding | H04W 76/10 370/329 |
| 2013/0155902 | A1* | 6/2013 | Feng | G06F 11/203 370/255 |
| 2013/0343229 | A1* | 12/2013 | Gasparakis | H04L 45/48 370/256 |
| 2014/0181319 | A1* | 6/2014 | Chen | H04L 69/12 709/234 |
| 2014/0185623 | A1* | 7/2014 | Yam | H04L 47/765 370/401 |
| 2014/0294018 | A1* | 10/2014 | Sung | H04L 63/0272 370/474 |
| 2015/0092564 | A1* | 4/2015 | Aldrin | H04L 41/5038 370/241.1 |
| 2015/0256580 | A1* | 9/2015 | Morton | H04N 21/64322 709/219 |
| 2015/0326470 | A1* | 11/2015 | Chu | H04L 45/122 370/392 |
| 2015/0326473 | A1* | 11/2015 | Dunbar | H04L 12/4633 370/392 |

* cited by examiner

SYSTEMS AND METHODS FOR IMPLEMENTING A LAYER TWO PROXY FOR WIRELESS NETWORK DATA

BACKGROUND

Mobile devices may be utilized to connect to service provider networks using software tunnels. For example, a Generic Routing Encapsulation (GRE) tunneling protocol may be utilized to provide layer two (i.e., 802.3) frames thereby enabling the mobile devices to act as part of another network. Currently, this is done in 3rd Generation Partnership Project (3GPP) and 3rd Generation Partnership Project 2 (3GPP2) networks utilizing Internet Protocol Security (IPSec) (i.e., layer three) protocols to encapsulate data traffic. However, current methods make it difficult provide only layer two frames to join another network as these frames require the use of both the GRE tunneling protocol in addition to IPSec protocols.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, implementing a termination device (which may be either a wireless access gateway or a virtual router gateway) as a layer two proxy for providing Open Systems Interconnection (OSI) Model layer two (e.g., media access control (MAC) layer, data link layer, etc.) frames to a service provider network having a service function chain (SFC) infrastructure. One example implementation may relate to the proxy receiving a request, over a wireless access network, to establish a tunnel over an OSI Model layer three network connection from one or more mobile devices. The proxy may then establish the tunnel. The proxy may then receive via the tunnel, device information and wireless network information from one or more mobile devices. Responsive to receipt of the device information and the wireless network information, the proxy may assign source and destination addresses to each mobile device. The source and destination addresses may correspond to the device information and the wireless network information. The proxy may further receive Internet protocol (IP) packets, via the tunnel, from each mobile device. The proxy may generate layer two frames utilizing the assigned source and destination addresses. The layer two frames may encapsulate each of the IP packets. The proxy may transmit the layer two frames to the SFC infrastructure.

In another example implementation, the proxy may receive IP packets encapsulated in layer two frames from the SFC infrastructure. The proxy may then separate the (i.e., strip) the layer two frames from the IP packets. The proxy may then send the IP packets to one or more mobile devices via a tunnel.

In example embodiments, a termination device (e.g., a wireless access gateway (WAG) or a virtual router gateway (VRG)) may be configured to establish a tunnel over a layer three wireless access network to allow mobile devices to use the Internet Protocol Security (IPSec) model for communicating layer 2 (802.3) frames to a service function chain (SFC) infrastructure within a service provider network. Thus, the termination device may act as a layer 2 (802.3) proxy. The proxy may, for a unique mobile device/access network pair, create and/or assign a corresponding source/destination media access control (MAC) pair. The proxy may further, for each IP packet received from a mobile device, generate corresponding layer 2 or 802.3 frames using the created/assigned source MAC/destination MAC pair to encapsulate each IP packet. The proxy may, in some instances, need to handle fragmentation and reassembly during the encapsulation process. The proxy may then feed the layer 2 frames into any SFC infrastructure requiring layer 2 frames. Additionally, for downlink frames (i.e., frames coming back from a layer 2 centric SFC to a mobile device), the proxy may strip the layer 2 frames and just insert IP packets into the tunnel back to the mobile device. Therefore, the proxy may facilitate a tunnel which eliminates the need to create layer 2 frames and insert them into a Generic Routing Encapsulation (GRE) tunnel on top of the an IPSec tunnel which is a requirement of previously utilized software tunnels such as SoftGRE.

The above descriptions of example implementations are for purposes of illustration and are not meant to be limiting. Although each of these implementations is described in greater detail below, such descriptions are also not meant to be limiting. Other descriptions, examples, etc., may also exist.

Figure 1:
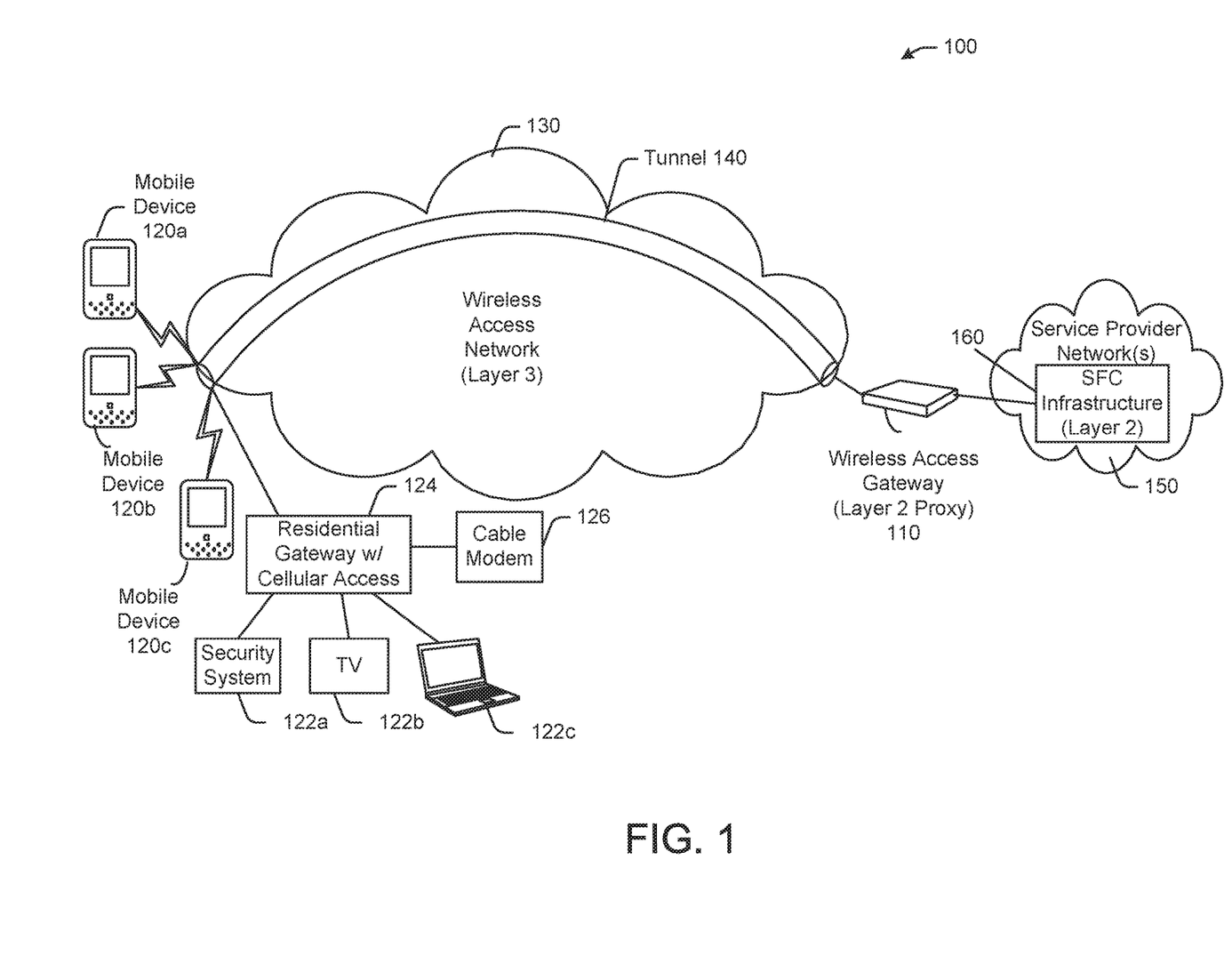
FIG. 1 illustrates an example network that includes devices configured to implement a layer two proxy for wireless data from mobile devices, according to an embodiment of the disclosure.

As described above, a termination proxy device (which may be either a wireless access gateway or a virtual router gateway) may be implemented as a layer two proxy for providing OSI Model layer two (e.g., MAC layer, data link layer, etc.) frames to a service provider network having an SFC infrastructure. FIG. 1 depicts an example network architecture 100 that includes devices configured to enable such an implementation. As shown, the architecture 100 may include, but is not limited to, a wireless access gateway (WAG) 110 (hereinafter referred to as the proxy 110) that may be in communication with various mobile devices 120a-120c (hereinafter the mobile devices 120) and a residential gateway 124 over a layer 3 wireless access network 130. The residential gateway 124 (which may be configured to provide cellular access to the wireless access network 130), may be located at a customer premises and may be connected to various user devices such as security system 122a, television 122b and laptop computer 122c as well as a cable modem 126. The proxy1 10 may also be in communication with one or more service provider networks 150 which may include a layer 2 SFC infrastructure 160.

As will be described in greater detail herein, the proxy 110 may be a termination device which functions as a layer 2 proxy for communicating layer 2 (or 802.3) frames from the mobile devices 120 and/or the residential gateway 124 to the SFC infrastructure 160. In particular, the proxy 110 may be configured to utilize a tunnel (i.e., a layer 3 IPSec tunnel) 140 for receiving 802.3 frames from the mobile devices 120 (and/or the residential gateway 124) for sending to the SFC infrastructure 160.

In some embodiments, the wireless access network 130 may be either a 3rd Generation Partnership Project (3GPP) (i.e., GSM) or a 3rd Generation Partnership Project 2 (3GPP2) (i.e., CDMA) network. As used herein, the term "device" may refer to any computing component that includes one or more processors that can be configured to execute computer-readable, computer-implemented, or computer-executable instructions. Example devices may include, but are not limited to, customer premise equipment, set-top boxes, cable modems, digital tablets, digital assistants, personal digital assistants, smart phones, personal computers, server farms, Internet appliances, smart cards, wearable devices, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate a personal cloud experience for users as described herein.

The above descriptions in FIG. 1 are for purposes of illustration and are not meant to be limiting. Other descriptions, examples, embodiments, etc., may exist in other examples.

Figure 2:
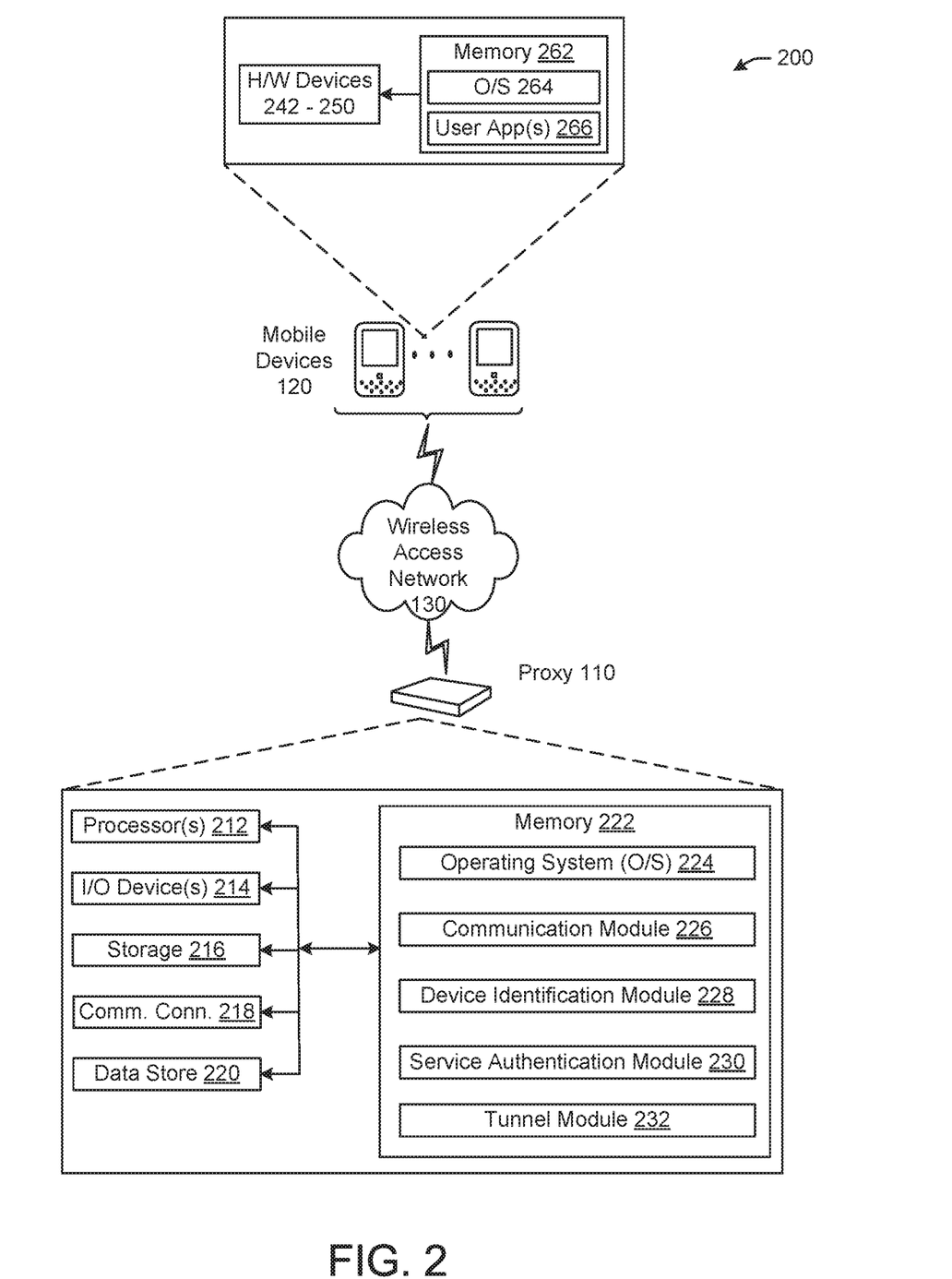
FIG. 2 illustrates an example computing environment for implementing a layer two proxy for wireless data from mobile devices, according to an embodiment of the disclosure.

FIG. 2 depicts an example computing environment 200 for implementing a layer two proxy for wireless data from mobile devices, according to an embodiment of the disclosure. The example computing environment 200 may include, but is not limited to, the proxy 110 and the mobile devices 120. Although a certain number of these devices are shown in FIG. 2, any number of these devices may exist in other embodiments. For example, other devices may include the residential gateway 124, the cable modem 126 and the user devices 122 shown in FIG. 1.

As described above in association with FIG. 1, the proxy 110 in FIG. 2 may communicate with the mobile devices 120 over the wireless access network 130. The proxy 110 in FIG. 2 may include one or more processors configured to communicate with one or more memory devices and various other components or devices. For example, the proxy 110 may include one or more processors 212 that are configured to communicate with one or more memory or memory devices 222, one or more input/output (I/O) devices 214, storage 216, one or more communication connections 218, and one or more data stores 220. The processor 212 may be implemented as appropriate in hardware, software, firmware, or a combination thereof. The hardware devices 242-250 associated with each of the mobile devices 120, may be the same or at least similar to the processor 212, the I/O devices 214, the storage 216, the communication connection 218 and the data store 220, respectively, in the proxy 110.

The memory 222 of the proxy 110 may store program instructions that are loadable and executable on the processor 212, as well as data generated during the execution of these programs. Depending on the configuration and type of the proxy 110, the memory 222 may be volatile, such as random access memory (RAM), and/or non-volatile, such as read-only memory (ROM), flash memory, etc. The memory 262 associated with each of the mobile devices 120, may be the same or at least similar to the memory 222.

The storage 216 of the proxy 110 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage associated within the home gateway 240 and the user device 270, respectively, may be the same or at least similar to the storage 216.

The memory 222 and the storage 216, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 222 may include multiple different types of memory, such as static random access memory (SRAM), dynamic random access memory (DRAM), or ROM.

The one or more communication connections 218 may allow the proxy 110 to communicate with the mobile devices 120.

The I/O devices 214 may enable interaction with the proxy 110. Such I/O devices 214 may include, but are not limited to, a keyboard, a mouse, a pen, a voice input device, a touch input device, a gesture capture or detection device, a display, a camera or imaging device, speakers, or a printer.

The data store 220 may store lists, arrays, databases, flat files, etc. In some implementations, the data store 220 may be stored in memory external to the proxy 110 but may be accessible via the wireless access network 130. In some embodiments, all or at least a portion of such information may be stored in the data stores 220, while at least another portion of the information may be stored in one or more databases or other storage mechanisms, whether local or remote from the proxy 110.

Turning to the contents of the memory 222, the memory 222 may include an operating system 224 and various software applications and/or modules that may implement or facilitate the processes described herein. Example modules may include, but are not limited to, a communication module 226, a device identification module 228, a service authentication module 230, and a tunnel module 232. Each of these modules may be implemented as individual modules that provide specific functionality associated with the processes implemented or facilitate herein by the proxy 110. Alternatively, one or more of the modules may perform all or at least some of the functionality associated with the other modules.

The operating system 224 may refer to a collection of software that manages computer hardware resources and provides common services for computer programs to enable and facilitate operation of such programs. Example operating systems may include Android, other mobile device operating systems, UNIX, Microsoft Windows, Apple OS X, Mac OS, Linux, Solaris, etc. The operating system 264 associated with each of the mobile devices 120 may include at least one of the above example operating systems.

The communication module 226 may configure the proxy 110 to communicate with the mobile devices 120 shown in FIG. 2, as described above. The device identification module 228 may identify the mobile devices 120. Such identification may include determining device and network (i.e., the wireless access network 130) information for the mobile devices 120.

The service authentication module 230 may authenticate access to layer 2 services in the SFC infrastructure 160 of the service provider network 150. By knowing which mobile device 120 has requested a service, the service authentication module 230 may determine whether the mobile device 120 and/or a user of the mobile device 120 may access the service.

The memory 252 of the proxy 110 may include a tunnel module 256. The tunnel module 256 may establish a tunnel with the mobile devices 120, in one embodiment.

The memory 282 of each of the mobile devices 120 may include one or more user applications 686. The one or more user applications 266 may configure the mobile devices 120 to send, receive, interact with, etc., various content, such as video, audio, data, multimedia, text, and other information.

Figure 3:
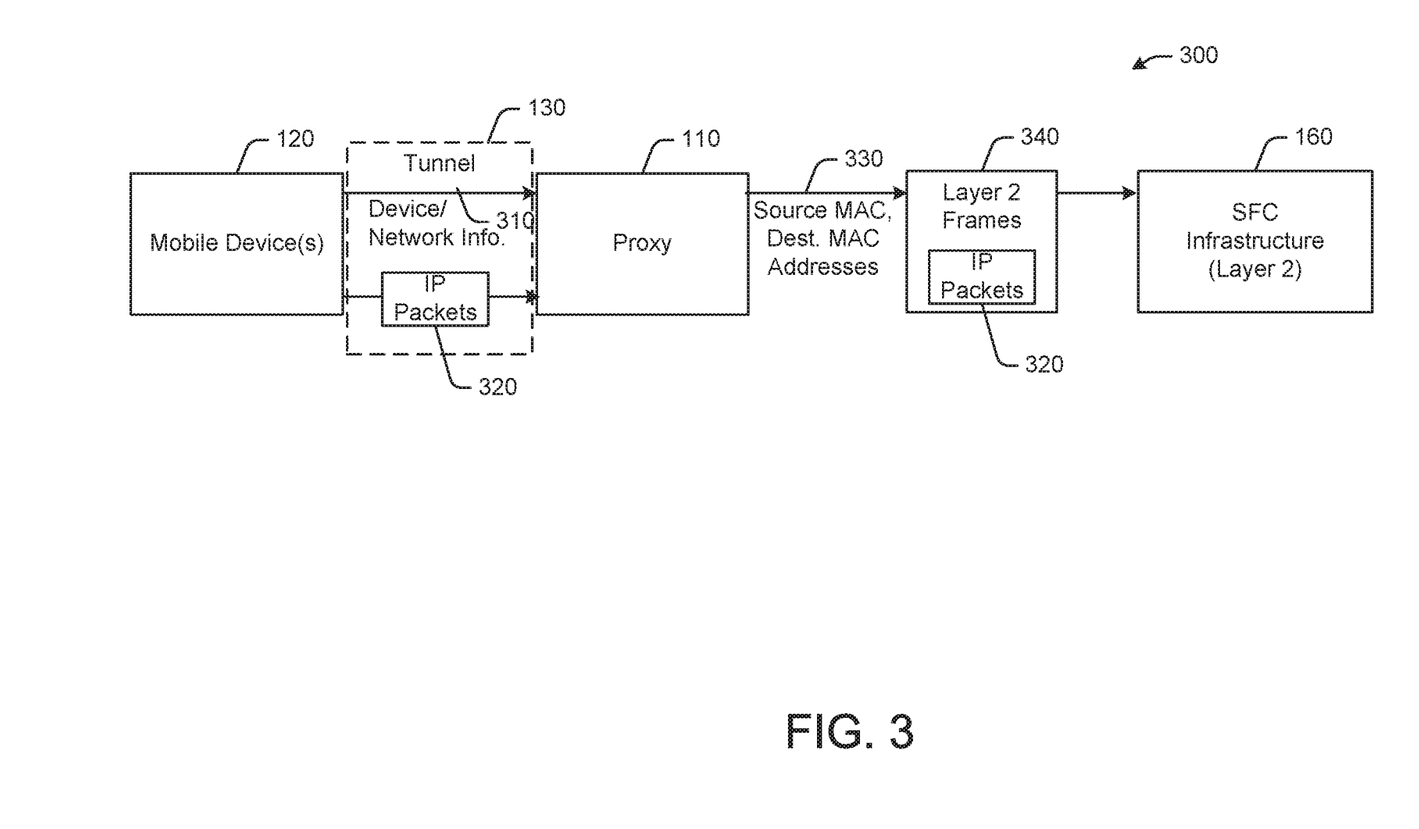
FIG. 3 illustrates a block diagram of an example environment for utilizing a layer two proxy to send layer two frames from mobile devices to a service function chain (SFC) infrastructure, according to an embodiment of the disclosure.

FIG. 3 illustrates a block diagram of an example environment 300 for utilizing a layer two proxy to send layer two frames from mobile devices to a service function chain (SFC) infrastructure, according to an embodiment of the disclosure. The environment 300 of FIG. 3 includes the proxy 110, the mobile devices 120, and the SFC infrastructure 160. The proxy 110 may be configured to establish the tunnel 140 and receive (over the tunnel 140) device information and wireless network information 310 from the mobile devices 120. The proxy 110 may then be configured to create and/or assign a source and destination MAC addresses 330 corresponding to the received device and wireless network information 310. The proxy 110 may also receive (over the tunnel 140) one or more IP packets from the mobile devices 120.

The proxy 110 may then be configured to generate layer two frames 340 utilizing the assigned source and destination MAC addresses 330. The layer two frames 340 encapsulate the IP packets 320 received from the mobile devices 120. The proxy 110 may then transmit the layer 2 frames 350 to the SFC infrastructure 160.

Figure 4:
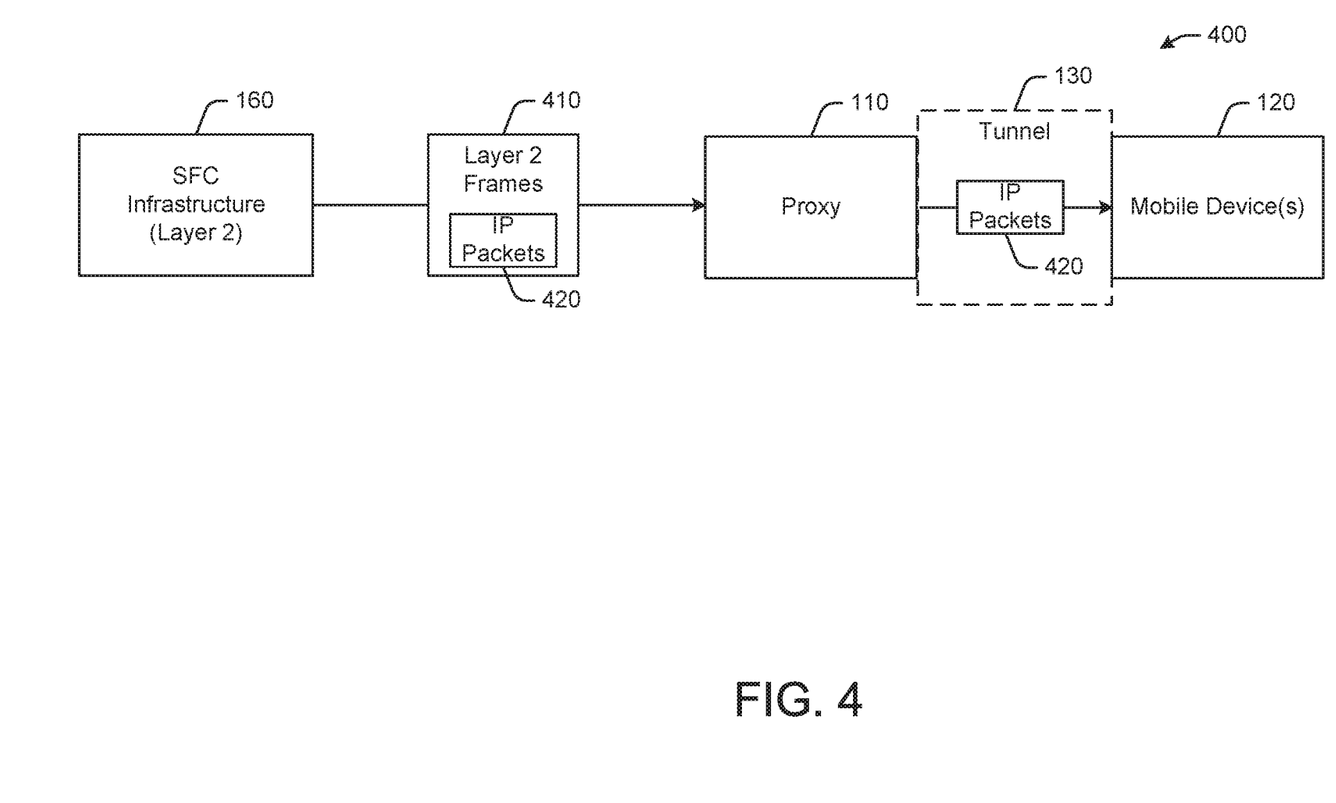
FIG. 4 illustrates a block diagram of an example environment for utilizing a layer two proxy to send Internet protocol (IP) packets from an SFC infrastructure to mobile devices, according to an embodiment of the disclosure.

FIG. 4 illustrates a block diagram of an example environment 400 for utilizing a layer two proxy to send Internet protocol (IP) packets from an SFC infrastructure to mobile devices, according to an embodiment of the disclosure. The environment 400 of FIG. 4 includes the proxy 110, the mobile devices 120, and the SFC infrastructure 160. The proxy 110 may be configured to receive layer two frames 410 from the SFC infrastructure 160. The layer two frames may include encapsulated IP packets 420. The proxy 110 may then strip the layer two frames 410 and insert only the IP packets 420 into the tunnel 140, back to the mobile devices 120.

Figure 5:
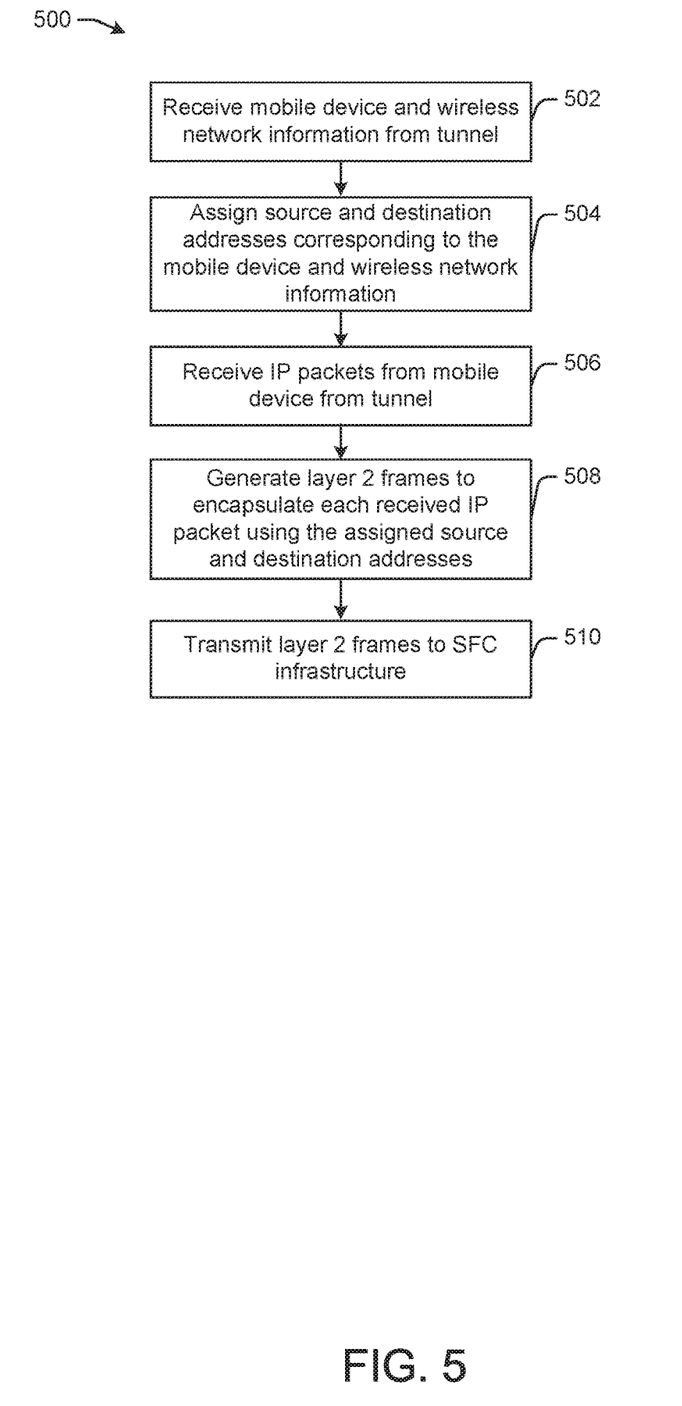
FIG. 5 illustrates a flow diagram of an example process for utilizing a layer two proxy for sending layer two frames from mobile devices to an SFC infrastructure, according to an embodiment of the disclosure.

FIG. 5 depicts a flow diagram of an example process 500 for utilizing a layer two proxy for sending layer two frames from mobile devices to an SFC infrastructure, according to an embodiment of the disclosure. The example process 500 may be implemented by the proxy 110 of FIGS. 1-4. The example process 500 may begin at block 502, where the proxy 110 may receive (e.g., by the communication module 226) mobile device and wireless network information, from the tunnel 140, for the mobile devices 120. In particular, the mobile device and wireless network information may be received over a layer three network connection. In one embodiment, the tunnel 140 may be an IPsec tunnel. In one embodiment, the layer three network connection may be a cellular network connection. The cellular network connection may include, but is not limited to, a global system for mobile communications (GSM) network connection, a code division multiple access (CDMA) network connection, and a long-term evolution (LTE) network connection.

The example process 500 may continue at block 504, where the proxy 110 may assign source and destination addresses corresponding to the device and wireless network information received at block 502. The source address may be a source media access control (MAC) address and the destination address may be a destination MAC address.

The example process 500 may continue at block 506, where the proxy 110 may receive IP packets from the mobile devices 120 from the tunnel 140.

The example process 500 may continue at block 508, where the proxy 110 may generate layer two frames to encapsulate each received IP packet using the assigned source and destination MAC addresses. In one embodiment, the layer two frames may be 802.3 downlink frames.

The example process 500 may continue at block 510, where the proxy 110 may transmit the layer two frames to the SFC infrastructure 160.

Figure 6:
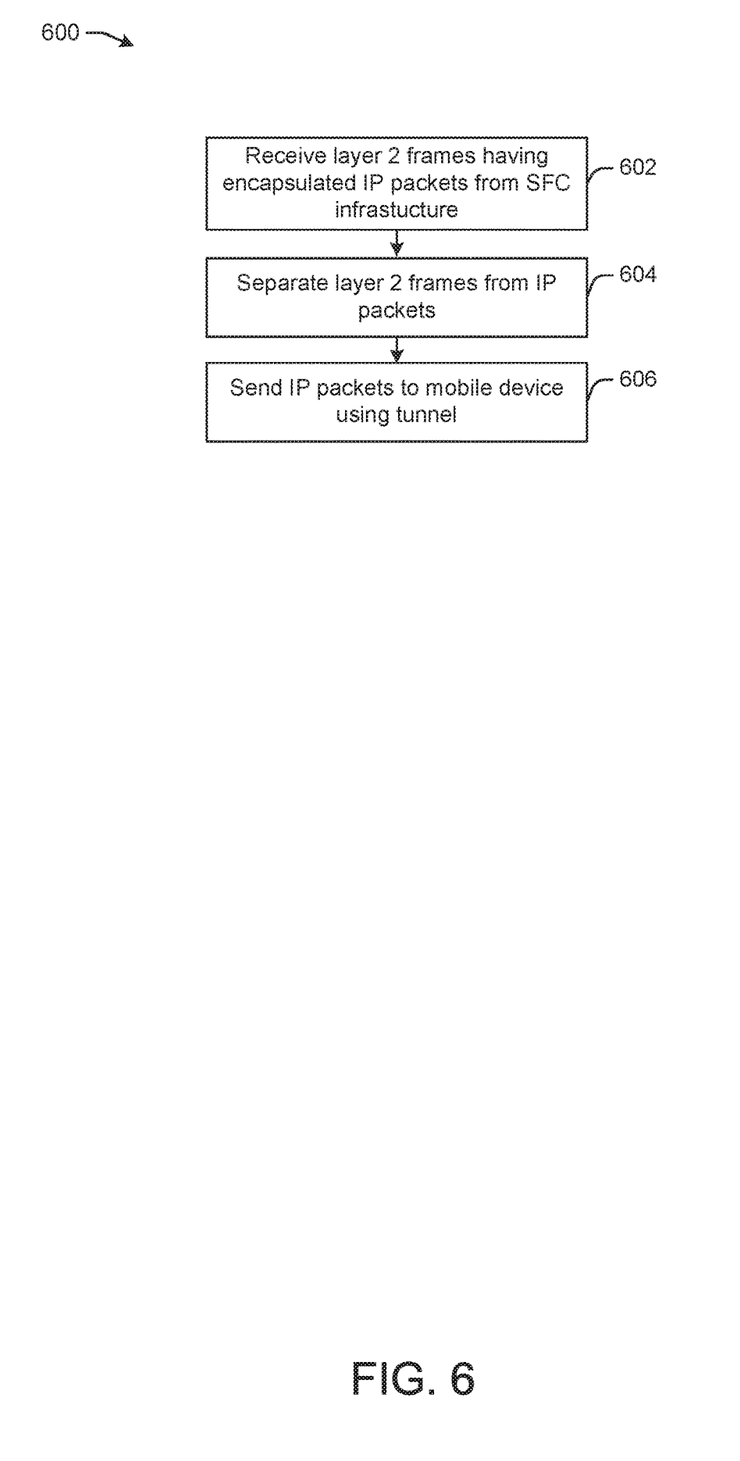
FIG. 6 illustrates a flow diagram of an example process for utilizing a layer two proxy for sending IP packets from an SFC infrastructure to mobile devices, according to an embodiment of the disclosure.

FIG. 6 depicts a flow diagram of an example process 600 for utilizing a layer two proxy for sending IP packets from an SFC infrastructure to mobile devices, according to an embodiment of the disclosure. The example process 600 may be implemented by the proxy 110 of FIGS. 1-4. The example process 600 may begin at block 602, where the proxy 110 may receive (e.g., by the communication module 226) layer 2 frames having encapsulated IP packets from the SFC infrastructure 160.

The example process 600 may continue at block 604 where the proxy 110 may separate (i.e., strip) the layer two frames from the IP packets. In one embodiment, the layer two frames may be 802.3 uplink frames.

The example process 600 may continue at block 606 where the proxy 110 may send the IP packets to the mobile devices 120 using the tunnel 140. In particular, the proxy 110 may be configured to insert the IP packets into an IPsec tunnel over a layer three connection with the mobile devices 120. In one embodiment, the layer three network connection may be a cellular network connection. The cellular network connection may include, but is not limited to, a GSM network connection, a CDMA network connection, and an LTE network connection.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
    at least one memory for storing computer-executable instructions; and
    one or more processors configured to access the at least one memory and execute the computer-executable instructions to:
        receive, via a tunnel, device information and wireless network information from at least one mobile device over a layer three network connection, wherein the layer three network connection comprises a cellular network connection;
        based at least in part on receipt of the device information and the wireless network information, generate a source address and a destination address for the at least one mobile device, the source address and the destination address corresponding to the device information and the wireless network information, wherein the source address is a source medium access control (MAC) address and the destination address is a destination MAC address;
        assign a unique MAC address pair for packet encapsulation, the unique MAC address pair comprising the source address and the destination address;
        receive, via the tunnel, an Internet protocol security (IPSec) packet from the at least one mobile device;
        encapsulate the IPSec packet into an uplink 802.3 MAC frame using the unique MAC address pair;
        cause the system to transmit the uplink 802.3 MAC frame to an uplink layer two service function chain (SFC) infrastructure.

2. The system of claim 1, wherein the tunnel comprises an IPSec tunnel.

3. The system of claim 1, wherein the cellular network connection comprises at least one of: a global system for mobile communications (GSM) network connection, a code division multiple access (CDMA) network connection and a long-term evolution (LTE) network connection.

4. The system of claim 1, wherein the destination MAC address is an uplink MAC address.

5. The system of claim 1, wherein the one or more processors are further configured to access the at least one memory and execute the computer-executable instructions to:
    receive, from the at least one mobile device, a request for a service; and
    establish, based at least in part on the request for a service, the tunnel.

6. The system of claim 1, wherein to cause the system to transmit the uplink 802.3 MAC frame to the uplink layer two SFC infrastructure comprises to cause the system to transmit the uplink 802.3 MAC frame to the uplink layer two SFC infrastructure without using the tunnel.

7. A method, comprising:
    receiving, at a device, via a tunnel, device information and wireless network information from at least one mobile device over a layer three network connection, wherein the layer three network connection comprises a cellular network connection;
    based at least in part on receiving the device information and the wireless network information, generating a source address and a destination address for the at least one mobile device, the source address and the destination address corresponding to the device information and the wireless network information, wherein the source address is a source medium access control (MAC) address and the destination address is a destination MAC address;
    assigning a unique MAC address pair for packet encapsulation, the unique MAC address pair comprising the source address and the destination address;
    receiving, via the tunnel, an Internet protocol security (IPSec) packet from the at least one mobile device;
    encapsulating the IPSec packet into an uplink 802.3 MAC frame using the unique MAC address pair;
    and
    causing the device to send the uplink 802.3 MAC frame to an uplink layer two service function chain (SFC) infrastructure.

8. The method of claim 7, wherein the tunnel comprises an IPSec tunnel.

9. The method of claim 7, wherein the cellular network connection comprises at least one of: a global system for mobile communications (GSM) network connection, a code division multiple access (CDMA) network connection and a long-term evolution (LTE) network connection.

10. The method of claim 7, wherein the destination MAC address is an uplink MAC address.

11. The method of claim 7, further comprising:
receiving, from the at least one mobile device, a request for a service; and
establishing, based at least in part on the request for a service, the tunnel.

12. The method of claim 7, wherein causing the device to transmit the uplink 802.3 MAC frame to the uplink layer two SFC infrastructure comprises causing the device to transmit the uplink 802.3 MAC frame to the uplink layer two SFC infrastructure without using the tunnel.

13. One or more non-transitory machine-accessible media having stored thereon instructions that, when executed by one or more machines, cause the one or more machines to perform operations comprising:
receiving, at a device, a downlink 802.3 medium access control (MAC) frame from an uplink layer two service function chain (SFC) infrastructure, the downlink 802.3 MAC frame comprising an Internet Protocol security (IPSec) packet encapsulated in the downlink 802.3 MAC frame, wherein the downlink MAC frame comprises a unique MAC address pair used to encapsulate the IPSec packet in the downlink 802.3 MAC frame, the unique MAC address pair comprising a source MAC address and a destination MAC address;
removing the IPSec packet from the downlink 802.3 MAC frame; and
causing to send the IPSec packet to one or more mobile devices via a tunnel, wherein causing to send the IPSec packet to the one or more mobile devices via the tunnel comprises causing to send the IPSec packet over a layer three network connection with the one or more mobile devices via the tunnel.

14. The one or more non-transitory machine-accessible media of claim 13, wherein the layer three network connection comprises a cellular network connection, the cellular network connection comprising at least one of: a global system for mobile communications (GSM) network connection, a code division multiple access (CDMA) network connection and a long-term evolution (LTE) network connection.

15. The one or more non-transitory machine-accessible media of claim 13, wherein the tunnel comprises an IPSec tunnel.

16. The one or more non-transitory machine-accessible media of claim 13, wherein the source MAC address is an uplink MAC address.

17. The one or more non-transitory machine-accessible media of claim 13, wherein receiving the downlink 802.3 MAC frame from the uplink layer two SFC infrastructure comprises receiving the downlink 802.3 MAC frame without using the tunnel.

\* \* \* \* \*